(12) United States Patent
Pedersen et al.

(10) Patent No.: US 7,089,031 B1
(45) Date of Patent: Aug. 8, 2006

(54) RADIO TERMINAL WITH BROWSER

(75) Inventors: Claus Pedersen, Vallensbaek (DK); Lars Bohn Hansen, Holte (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/958,985

(22) PCT Filed: Mar. 10, 2000

(86) PCT No.: PCT/EP00/02192

§ 371 (c)(1),
(2), (4) Date: Jan. 15, 2002

(87) PCT Pub. No.: WO00/65475

PCT Pub. Date: Nov. 2, 2000

(30) Foreign Application Priority Data

Apr. 26, 1999 (GB) .................................. 9909564

(51) Int. Cl.
*H04B 1/38* (2006.01)
(52) U.S. Cl. ................ 455/550.1; 455/557; 455/414.1; 370/395.1
(58) Field of Classification Search ............ 455/556.1, 455/556.2, 557, 560, 550.1, 552.1, 414.1; 709/203; 370/351–356, 395.1–2
See application file for complete search history.

(56) References Cited

U.S. PATENT DOCUMENTS

| 5,895,471 | A | | 4/1999 | King et al. |
| 6,045,037 | A | * | 4/2000 | McGeehin ............. 229/125.39 |
| 6,094,587 | A | * | 7/2000 | Armanto et al. ............ 455/567 |
| 6,137,791 | A | * | 10/2000 | Frid et al. .................... 370/352 |
| 6,198,941 | B1 | * | 3/2001 | Aho et al. ............... 455/552.1 |

(Continued)

FOREIGN PATENT DOCUMENTS

EP 0 677 974 A2 4/1995

(Continued)

OTHER PUBLICATIONS

Liljeberg, M. et al: "Optimizing World-Wide Web for Weakly Connected Mobile Workstations: An Indirect Approach", International Workshop on Services in Distributed and networked Environments, Jun. 5, 1995, pp. 132-139, XP000764774.

(Continued)

*Primary Examiner*—CongVan Tran
(74) *Attorney, Agent, or Firm*—Alston & Bird LLP

(57) ABSTRACT

A terminal for providing an application using a browser. The terminal comprises a transceiver arranged to send radio packets to and receive radio packets from a server, and means for determining if the terminal and server are able to communicate. The terminal further comprises an outbox buffer, and a browser application for displaying content stored in the server. The browser application is arranged to initiate a first application by accessing a first item associated with the first application from the server using a first content identifier. The application being provided by the combination of the first item and further items each of which is accessible using an individual content identifier, and each of which comprises content, or means for linking to content. The browser further comprising means for creating content in association with an item and means for transferring messages comprising the created content to the server.

19 Claims, 8 Drawing Sheets

U.S. PATENT DOCUMENTS

| | | | | |
|---|---|---|---|---|
| 6,215,994 | B1 * | 4/2001 | Schmidt et al. | 455/419 |
| 6,233,452 | B1 * | 5/2001 | Nishino | 455/435.2 |
| 6,269,094 | B1 * | 7/2001 | Lecomte et al. | 370/352 |
| 6,269,336 | B1 * | 7/2001 | Ladd et al. | 704/270 |
| 6,289,212 | B1 * | 9/2001 | Stein et al. | 455/412.1 |
| 6,377,790 | B1 * | 4/2002 | Ishii | 455/343.1 |
| 6,519,241 | B1 * | 2/2003 | Theimer | 370/338 |
| 6,522,875 | B1 * | 2/2003 | Dowling et al. | 455/414.3 |
| 6,535,743 | B1 * | 3/2003 | Kennedy et al. | 455/456.1 |
| 6,547,213 | B1 * | 4/2003 | Heinz et al. | 251/57 |
| 6,587,457 | B1 * | 7/2003 | Mikkonen | 370/356 |
| 6,600,930 | B1 * | 7/2003 | Sakurai et al. | 455/414.3 |
| 6,668,046 | B1 * | 12/2003 | Albal | 379/119 |
| 6,690,681 | B1 * | 2/2004 | Preston et al. | 370/493 |
| 6,693,894 | B1 * | 2/2004 | Andersson et al. | 370/352 |
| 6,700,962 | B1 * | 3/2004 | Albal et al. | 379/126 |
| 6,847,632 | B1 * | 1/2005 | Lee et al. | 370/352 |
| 6,865,169 | B1 * | 3/2005 | Quayle et al. | 370/335 |

FOREIGN PATENT DOCUMENTS

| | | |
|---|---|---|
| EP | 0677974 | 4/1995 |
| EP | 0886228 | 12/1998 |
| GB | 2330502 | 4/1999 |
| WO | 9858332 | 12/1998 |
| WO | 99/25108 | 5/1999 |
| WO | 9925108 | 5/1999 |
| WO | 99/35595 | 7/1999 |
| WO | 9935595 | 7/1999 |

OTHER PUBLICATIONS

Wireless Application Protocol Architecture Specification, appearing in WAP Architecture, Version 30-Apr.- 1998, ©Wireless Application Protocol Forum, Ltd., 1998.

European Search Report.

* cited by examiner

US 7,089,031 B1

RADIO TERMINAL WITH BROWSER

BACKGROUND OF THE INVENTION

1. Field of the Invention

The present invention relates to a radio terminal for browsing the Internet. It particularly relates to increasing the functionality of such a terminal.

2. Description of the Prior Art

Mobile phones are becoming widely used as they provide security, mobility and flexibility. Recently the popularity of the Internet has increased among the general population. The Internet can be browsed using a so-called browser application, which provides an easily usable visual interface. It would be particularly desirable to combine the hand held nature of a mobile phone and its associated portability with the ability to browse the Internet. The wireless application protocol (WAP) has been developed with this purpose in mind. It allows a radio handset to communicate with a transceiver at an Internet gateway and accesses the Internet through a radio link. A Wireless Application Environment which forms a upper layer of the WAP stack includes a microbrowser. The browser uses wireless mark-up language (WML) and a lightweight mark-up language, WMLScript a lightweight scripting language. WML implements a card and deck metaphor. The interaction of the browser and user is described in a set of cards which are grouped together into a document commonly referred to as a deck. The user navigates to a card in a deck, reviews its content and then navigates to another card in the same deck or in a different deck. Decks of cards are transferred from origin servers as needed.

A desktop computer or the like, has until now been the standard device for accessing the World Wide Web. The computer generally has a display, a cursor control and selecting device such as a mouse and a keyboard. When using a device to browse the World Wide Web, the device generally exchanges information with the Internet gateway over a fixed high band-width link. The device acts as a client and the Internet as a server. The browser can access an 'item' of content using a URL. This item allows access to further items of content each of which comprises content or means for linking to content. Typically content is downloaded from the Internet to the device to allow a browser application in the device to display one page having a number of icons which are 'active'. Choosing and selecting an icon using the cursor control and selection device activates a 'link' to another defined page. The browser application requests this page from the Internet gateway acting as server. Content downloaded from the Internet to the device allows the browser application to display the page, which has been linked to. This page may in turn display 'active' icons for uses selection. The browser application mediates between the user and the Internet. It sends requests to the Internet and receives content therefrom.

The content received from the Internet may be instructions allowing the browser application to recreate a page with the correct links. It may, however, be content which cannot be processed by the browser application but which requires a separate different application such as an email application, a news reading application, etc. Portable terminals and hand held devices in particular have limited processing and memory resources. It is desirable to maximize their resources by integrating these applications with the browser without significantly increasing the complexity of the browser application itself. Such integration may require modification of the Wireless Application Protocol and in particular modification of WML and/or WMLScript.

SUMMARY OF THE INVENTION

It would be desirable to use a browser to provide the functionality of other applications in a portable terminal which communicates over a radio link with a server while maintaining the simple functionality of the browser. It would be desirable if the applications did not require a permanent high bandwidth link between the terminal and server.

According to one aspect of the present invention there is provided a terminal for providing an application using a browser, comprising:

a transceiver arranged to send radio packets to and receive radio packets from a server;

means for determining if the terminal and server are able to communicate; an outbox buffer; and a browser application for displaying content stored in the server, arranged to initiate a first application by accessing a first item associated with the first application from the server using a first content identifier, the application being provided by the combination of the first item and further items each of which is accessible using an individual content identifier, and each of which comprises content, or means for linking to content, the browser further comprising means for creating content in association with an item and means for transferring messages comprising the created content to the server, wherein if the terminal and server are able to communicate, the browser sends the messages to the server and if the terminal and server are unable to communicate, the browser temporarily stores the messages in the outbox until the terminal and server are able to communicate when the stored messages are automatically sent to the server.

According to another aspect of the present invention there is provided a system comprising a server and a terminal for providing an application using a browser, the terminal comprising:

a transceiver arranged to send radio packets to and receive radio packets from the server;

means for determining if the terminal and server are able to communicate; an outbox buffer; and a browser application for displaying content stored in the server, arranged to initiate a first application by accessing a first item associated with the first application from the server using a first content identifier, the application being provided by the combination of the first item and further items each of which is accessible using an individual content identifier, and each of which comprises content, or means for linking to content, the browser further comprising means for creating content in association with an item and means for transferring messages comprising the created content to the server, wherein if the terminal and server are able to communicate the browser sends the messages to the server and if the terminal and server are unable to communicate, the browser temporarily stores the messages in the outbox until the terminal and server are able to communicate when the stored messages are automatically sent to the server.

BRIEF DESCRIPTION OF THE DRAWINGS

For a better understanding of the present invention and to understand how the same may be brought into effect reference will now be made by way of example only to the accompanying drawings in which.

BEST MODE FOR CARRYING OUT THE INVENTION

Figure 1:
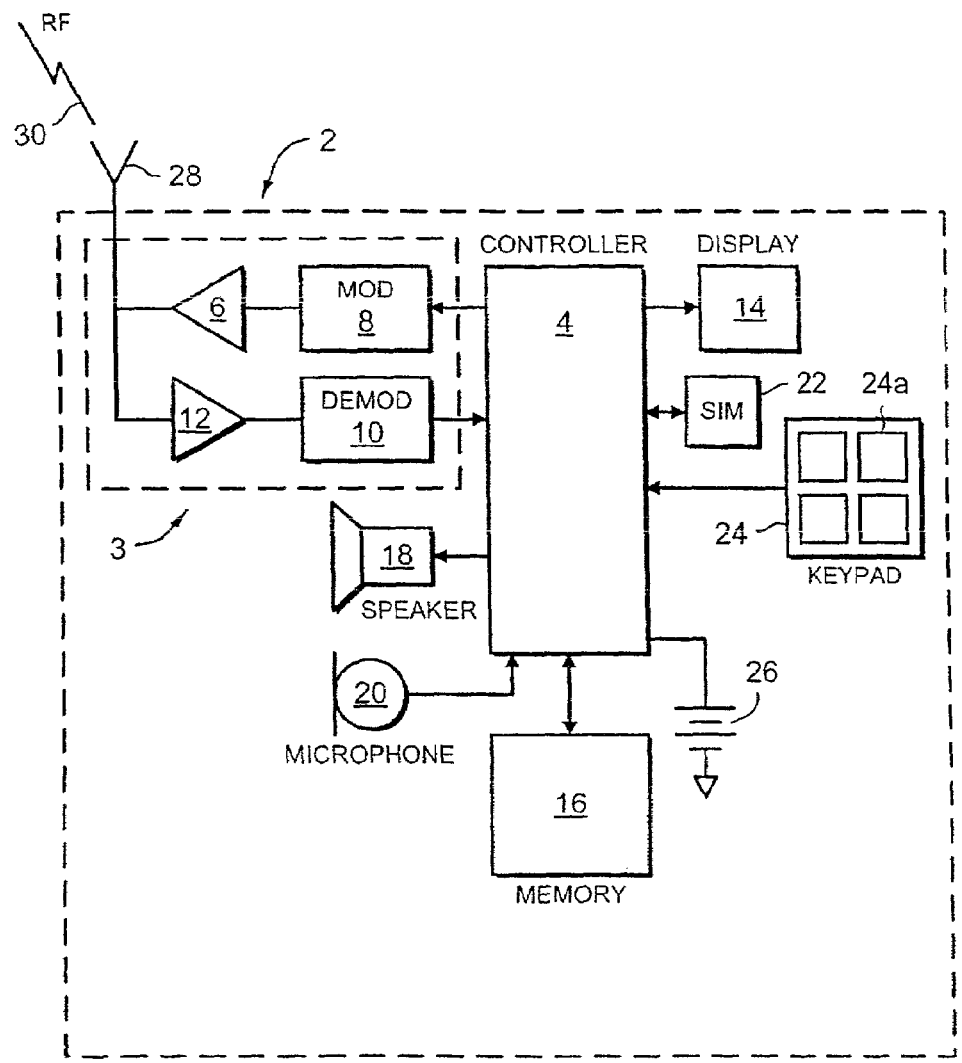
FIGS. 1 and 2 schematically illustrate a radio handset.
Figure 2:
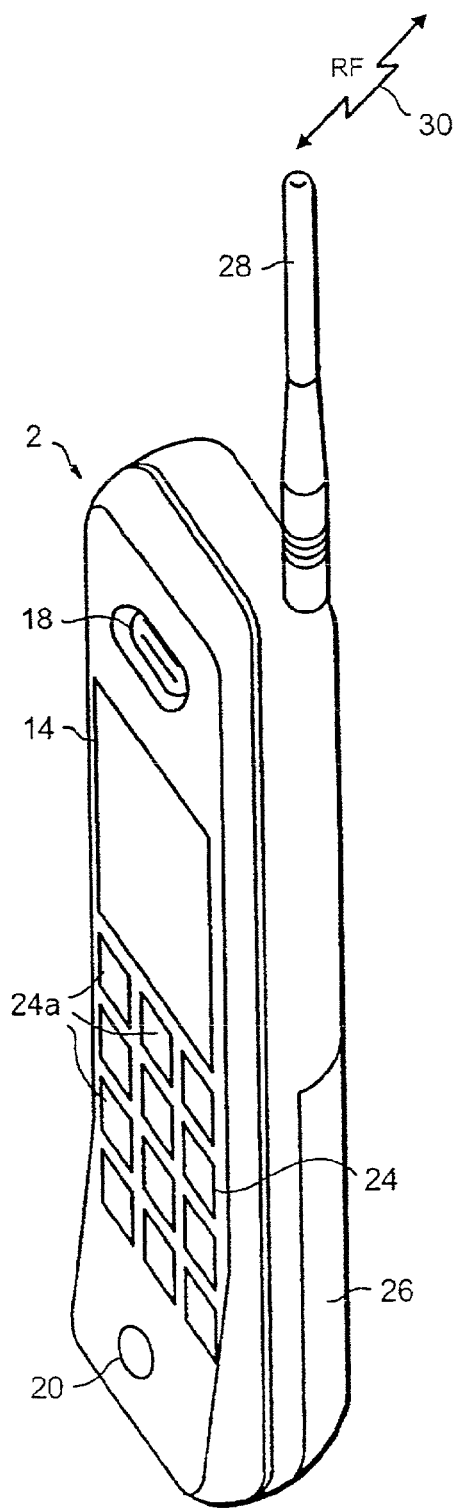

FIGS. 1 and 2 illustrate a hand-portable radio communications device, henceforth referred to as a terminal or radio handset 2. The terminal 2 is small enough to be carried by hand and is preferably sized to fit into a pocket of a jacket. The terminal communicates with other terminals or devices using radio waves.

The terminal 2 has a user interface comprising, for input, a keypad 24 having keys 24a and a microphone 20 and, for output, a speaker 18 and a display 14. The size of keypad 24 and display 14 are necessarily limited by the size of the terminal 2. The terminal 2 is controlled by controller 4 and is powered by battery 26. The controller 4 receives signals from the microphone 20 and the keypad 24 and provides signals to the display 14 and the speaker 18. The terminal 2 has a transceiver 3, which is used to communicate outside the terminal 2. The transceiver 3 is a radio frequency transceiver connected to an antenna 28 and controller 4. It is arranged to communicate via a radio frequency interface 30. The transceiver 3 includes a modulator 8 for modulating signals received from the controller 4 and a transmitter 6, which presents the modulated signals to the antenna 28. The transceiver 3 also includes a receiver 12 which processes signals received at the antenna 28 and provides them to a demodulator 10 which provides demodulated signals to the controller 4. The terminal 2 has a memory 16 which is connected to the controller 4 via a bus. The terminal also has a SIM memory 22 connected to the controller 4 which provides information allowing the terminal 2 to function as a mobile phone. When functioning as a mobile phone, the terminal 2 transmits and receives radio frequency signals via the antenna 28. The fundamental functions of the terminal 2 are provided by the combination of the controller 4 and the memory 16.

The terminal 2 has a number of fundamental capabilities including system capabilities relating to radio communication. The terminal when functioning as a phone will use standard communication protocols such as GSM, AMPS etc. and when functioning as an Internet terminal will use the Wireless Application Protocol (WAP) The WAP protocol provides for a web browser.

Figure 3:
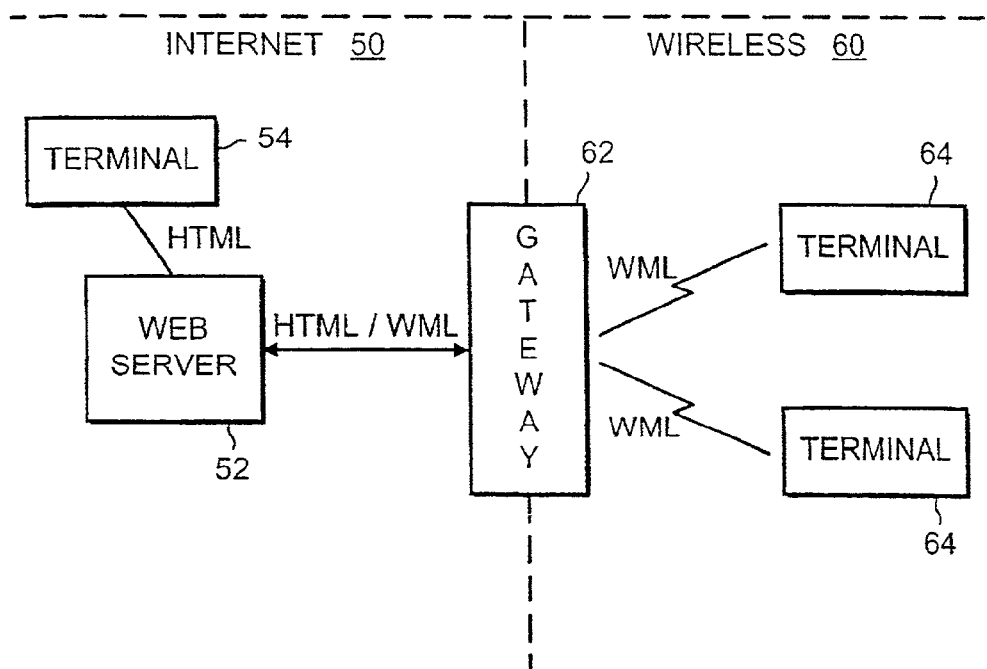
FIG. 3 illustrates a network for accessing the Internet.

FIG. 3 illustrates an Internet network 50 and a wireless network 60. The Internet network comprises a web server 52 and a plurality of internet stations 54, which are clients to the web server 52. The Internet network uses World Wide Web (WWW) protocols. The wireless network 60 includes a plurality of wireless terminals 64, each of which can access the web server 52 via a protocol gateway 62. These terminals are preferably hand-portable radio handsets. Communication between a wireless terminal 64 and the protocol gateway 62 is according to the Wireless Application Protocol (WAP). WAP specifies an application framework and network protocols for wireless terminals such as mobile telephones, pagers and personal digital assistants. WAP brings Internet content and advanced data services to wireless terminals. WAP can work across differing wireless network technologies and bearer types (GSM, CDMA, SMS). Communication between the web server 52 and protocol gateway 62 is according to WWW protocols.

The wireless terminal differs from the Internet station in that generally it has a less powerful CPU, less memory, restricted power consumption, smaller displays and more limited input devices. The wireless network differs from the Internet network in that generally it has less bandwidth, more latency, less connection stability and less predictable availability. The WAP architecture is optimized for narrow bandwidth bearers with potentially high latency and is optimized for efficient use of device resources.

Each device in a network is capable of sending and receiving packets of information. A device may according to context be a server or a client, and a server may service a number of clients while being a client to another server. Devices include the web server 52, the Internet stations 54, the wireless terminals 64 and the protocol gateway 62. A wireless terminal 64 acts as client and initiates a request for a connection with an origin server, the web server 52, to access a resource. The resource, identified by a URL (Uniform Resource Locator), is data (content) stored or generated at an origin server 52. The content is typically displayed or interpreted by the client. The protocol gateway translates requests from the WAP protocol stack used by the wireless terminal 64 to the WWW (World Wide Web) protocol stack used by the web server. The web server either returns WAP content such as WML (Wireless Markup Language) or WWW content such as HTML (HyperText Markup Language). In the later case a filter is used to translate the WWW content to WAP content e.g. HTML to WML. The protocol gateway also encodes content sent over the wireless network to the wireless terminal and decodes data sent to it by the wireless terminal.

WAP defines a set of standard protocols that enable communication between mobile terminals and network servers. WAP uses a standard naming model according to which standard Internet URLs are used to identify content on origin servers. It also uses content typing. All WAP content is given a specific type consistent with WWW typing which allows a wireless terminal to correctly process the content based on type. WAP also uses standard content formats and standard communication protocols.

A Wireless Application Environment which forms a upper layer of the WAP stack includes a microbrowser. The browser uses wireless markup language (WML) and a lightweight markup language, WMLScript a lightweight scripting language. Embodiments of the present invention provide the functionality of additional applications, for example email applications or news reader applications by creating extensions to WML and WMLScript. This allows the processing power of the terminal to be restricted, allows a standard WAP browser to be used and provides flexibility for new features.

Figure 4:
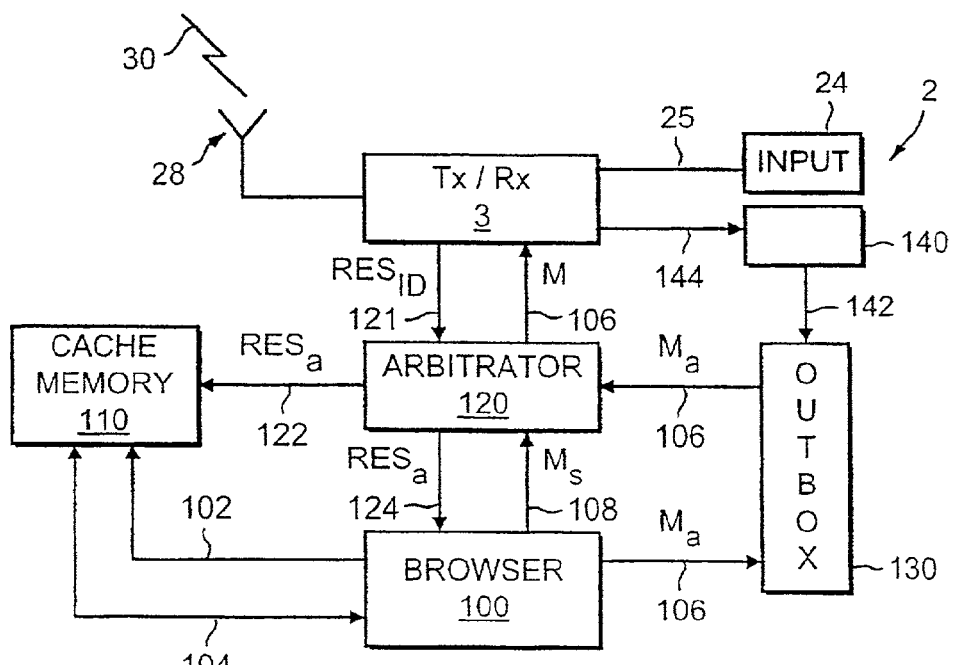
FIG. 4 is a schematic representation of the operation of a browser application in a terminal according to a first embodiment.

FIG. 4 is a schematic illustration of the operation of a browser application 100 in a terminal 2. The browser application provides the normal browsing functions provided by WAP up until this time but in addition provides other additional functions through the browser application such as email applications and news reading applications.

The additional applications are provided by transferring content to the terminal. The content provides a hierarchy of decks which is used by the browser to emulate an additional application. The "master copy" of the content for emulating the additional application in the browser is stored and retained in the server. Any update or change to the content in the browser occurring during the use of the additional application must be communicated to the server so that the "master copy" of the content can be updated.

The figure includes the antenna 28 which communicates over the interface 30, the transceiver 3, the browser application 100, a cache memory 110 which may be part of the controller 4 or memory 16 in FIG. 1, an arbitrator 120, an outbox 130, an outbox controller 140 and the input 24.

The transceiver 3 receives messages from the arbitrator 120 for transmission over the interface 30 and supplies messages 121 received over the interface 30 to the arbitrator 120. The arbitrator 120 determines whether a received message is in response to a request from the browser (synchronous) or is not in response to a request from the browser but pushed from the server over interface 30 (asynchronous). An identifier in the messages transmitted over the interface 30 identifies whether the received messages are synchronous or asynchronous. The arbitrator 120 determines from the identifier whether a received message is synchronous or asynchronous and directs the received asynchronous messages 122 to the cache memory 110 and directs the received synchronous messages 124 to the browser 100. The browser 100 on receiving a message 124 accesses and responds to its content, it then sends the content 102 to the cache memory 110 where it is stored such that it can be accessed using the content's URL. The content in the received asynchronous message is stored in the cache memory 110 such that it can be accessed using the content's URL. The cache is unitary and is not partitioned. The content stored in the cache is not stored in different segments depending on the application it relates to. The content for all applications is stored in the undivided cache. This may be on a first in first out basis or alternatively the content could have different priorities with the order of deletion of the content from the memory being dependent upon the priorities.

In the browser application URLs are used to access content. First the browser attempts to access the content in the cache 110 using the correct URL. If the content is stored in the cache it is read 104 from the cache into the browser. If the content is not in the cache, the read is unsuccessful and the browser synchronously requests the content from the server over the interface 30. The browser creates a message 108 containing the required content's URL and sends the message to the server over the interface 30. The browser then waits for a synchronous reply message 124 containing the required content to be returned by the server over the interface 30 and directed by the arbitrator 120 to the browser 110. The browser then responds to the received content.

The server can provide push content to the terminal asynchronously without the content being requested. The arbitrator 120 directs this received content to the cache 110 where it can be accessed by the browser at a later time.

The browser 100 when emulating an application, can modify the "master copy" of the content stored in the server. This "master copy" is transferred in whole or in part to the terminal to emulate the application. The modification is effected by sending asynchronous messages 106 from the browser to the server. The messages are sent from the browser 100 to the outbox 130. The outbox 130 under the control of the enable/disable signal 142 provided by the outbox controller 140 can send the messages to the server via the interface 30. When the outbox controller 140 disables the outbox 130, the outbox buffers the messages 106. When the outbox controller 140 enables the outbox 140 the outbox 130 empties automatically and continues to empty automatically until disabled. When the outbox empties the messages stored there are transferred to the transceiver for transmission. The outbox controller 140 receives a input control signal 144 from the transceiver 3. This signal controls whether the controller 140 enables or disables the outbox 130. When the transceiver is able to communicate with the server over the interface 30 the input control signal 144 enables the outbox 130. When the transceiver is unable to communicate with the server over the interface 30 for example because the transceiver is disabled, the terminal is out of radio coverage of the server or the radio interface between the server and terminal is degraded, then the input control signal 144 disables the outbox 130 and the asynchronous messages 106 are buffered. The outbox can be controlled by adding new library calls to existing WML-Script functionality.

The input 24 when activated provides a signal which disable the transceiver 3. Disablement of the transceiver prevents communication over the interface 30 but does not otherwise affect the terminal. Thus the browser application may be used in situations where radio transmission is undesirable for example on an airplane. In particular it may be used to access the additional functions provided by the browser, for example, off-line email reading and composing, re-plying to previously received emails and off-line news reading. The actions undertaken while off-line which affect the "master copy" of the content used for emulating the active application(s) in the browser are stored as messages 106 in the outbox 130 and sent when the terminal comes on-line again.

Figure 5A:
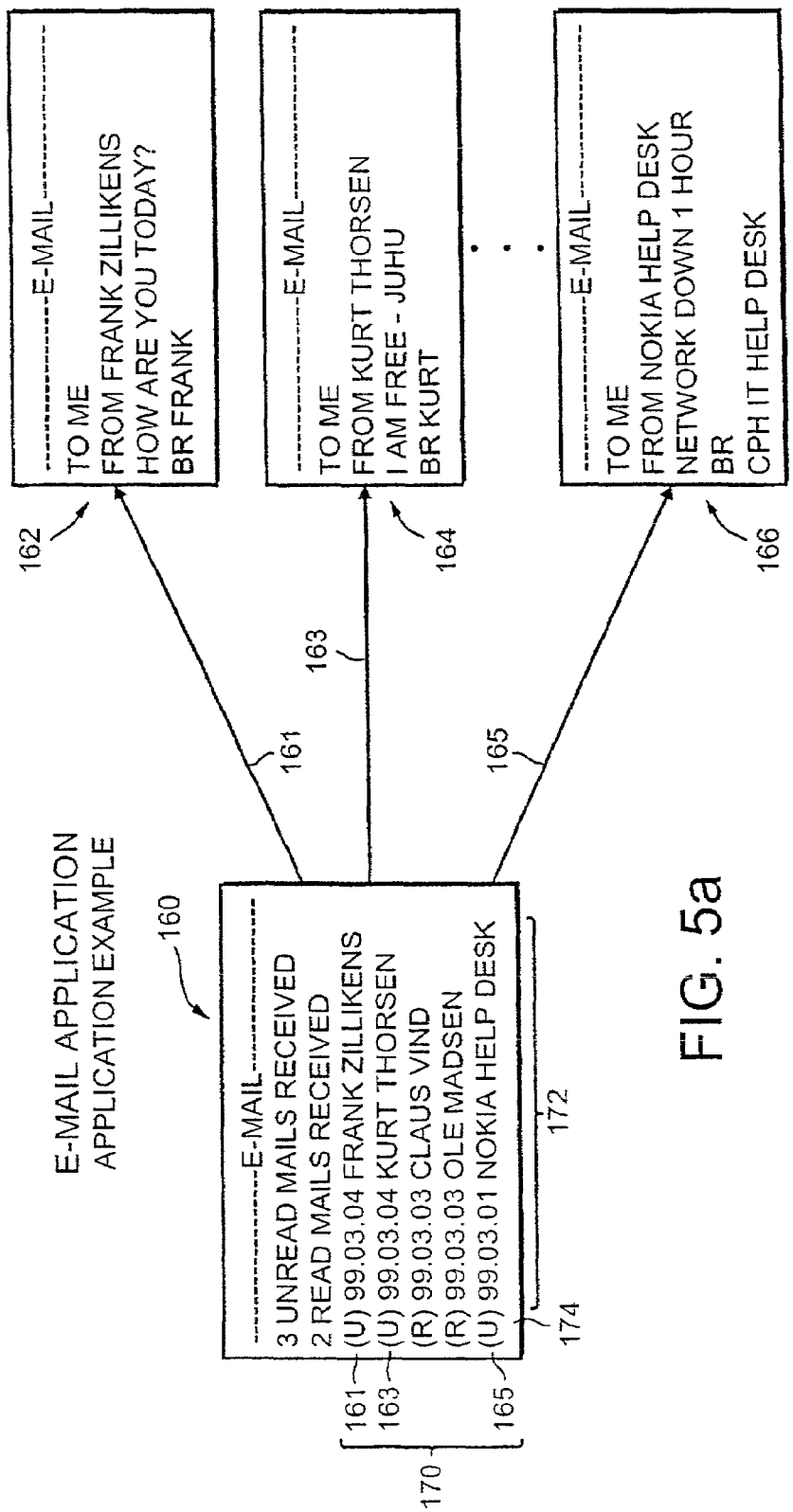
FIGS. 5a and 5b illustrate the hierarchy of items used to provide an email application and a news reading application respectively.

FIG. 5*a* illustrates a hierarchy of inter-linked items each of which contains content. The combination of items is used to emulate an application in a browser of a terminal. The items are stored in the server as a "master copy" and are transferable to a terminal to emulate an application. The items are maintained in the server and transferred to the terminal over the interface as and when necessary. Although the items may be modified by using the browser, the items maintained in the server must be brought into conformity with any such modifications.

In the example shown, the items in combination provide the functionality of an email application. A first item 160 provides user selectable links 161, 163, 165 to respective further items 162, 164 and 166. The item 160 and each of the further items 162 are each created from a deck. In this example the first item provides on the terminal display a list 170 of user selectable links 161, 163–165 each of which represents an email. Selection of a link accesses the appropriate further item and displays the text of an email on the display. Each of the links has two portions. A first text portion 172 gives a description of the link, in this case the date and author of each email, and a second text portion 174 gives a visual indication of a parameter associated with that link. In this case the parameter indicates whether a link has previously been activated (R) to read the email or not activated (U). It is apparent therefore that operation of the application may change the content received at the browser for example changing the parameter from indicating U to R. The browser will update the items in the server to reflect the modifications using the asynchronous messages 106.

Typically the email application would be accessed through a bookmark list in the browser which lists a number of favorite internet pages and the email application. Each of the entries has an associated URL and selecting an entry in a bookmark list causes the browser to access the content associated with the URL. The cache 110 will be accessed first and if the content is not present, a request will be made over the interface 30 to the server. The email application entry in the bookmark list is associated with the URL of the first item (the deck) 160. Accessing the first item 160 automatically provides the means for accessing the remaining further items which provide the email application. The further items are accessed by reading them from the cache and if this is unsuccessful by transferring them over the interface 30.

Figure 5B:
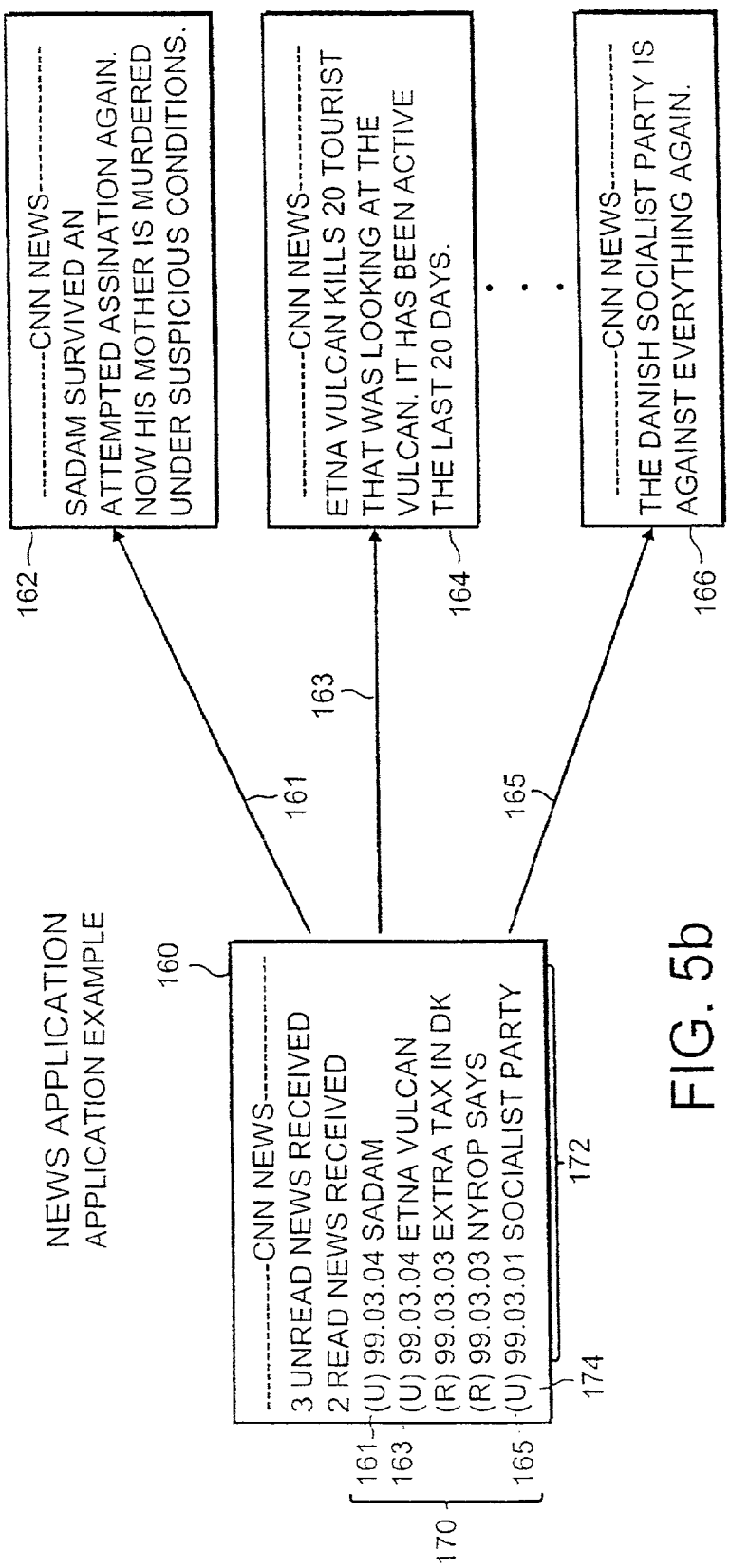

FIG. 5*b* is similar to FIG. 5*a* and illustrates a hierarchy of items containing content. The items in combination provide the functionality of a news reader application. As previously a first Item 160 provides user selectable links 161, 163, 165 to respective further items 162, 164 and 166. The item 160 and each of the further items 162 are each created from a so-called deck In WAP. In this example the first item provides on the terminal display a list 170 of user selectable links 161, 163, 165 each of which represents a news piece. Selection of a link accesses the appropriate further item and displays the text of the news piece on the display. Each of the links has two portions. A first text portion 172 gives a description of the link, in this case the date and news headline of each news piece, and a second text portion 174 gives a visual indication of a parameter associated with that link. In this case the parameter indicates whether a link has previously been activated (R) to read the news piece or not activated (U).

Figure 6:
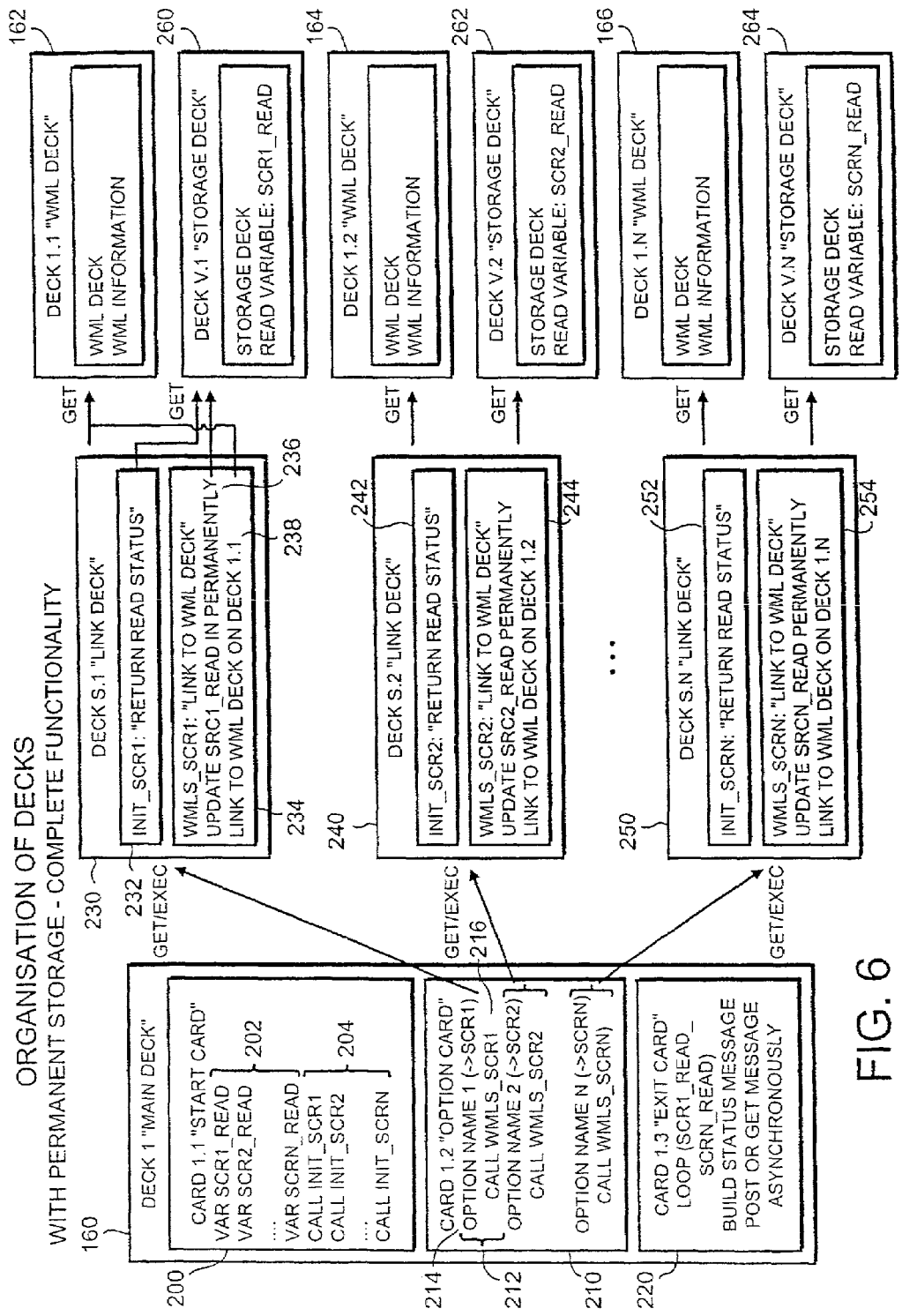
FIG. 6 illustrates the items in a hierarchy in more detail.

FIG. 6 illustrates the hierarchy of content items which co-operate to provide the functionality of an additional application to the browser. The "master copy" of this content is stored on the server. Each of the content items has an individual URL and can be accessed by the browser using the URL. Access in this context means that if the item is stored in the cache it will be read from the cache using its URL and processed in the browser, and if the item is not stored in the cache, the browser will request the item using its URL from the server over the interface 30. The first item 160 is a deck called the Main deck and it identifies the other items and their URLs to the browser. The Main Deck 160 is accessed by first getting the Main Deck's URL. If the Main Deck is stored in the cache, the URL will be used to load the Main Deck from the cache otherwise the browser requests the deck from the server over the interface 30 using the URL. The Main Deck's URL may be obtained by selecting a bookmark in the browser application which is associated with the URL of the Main Deck or by reading the URL from a SIM on which the Main Deck's URL is stored. Thus operators could pre-program SIM cards before release with the URL's for the additional applications they support.

The Main Deck 160 comprises three cards: the Start Card 200, the Option Card 210 and the Exit Card 220. Each of the cards has an individual URL. When the Main deck is loaded into the browser, the Start Card is automatically activated. The start card has a first portion 202 which defines a number of parameters (SCR1, SCR2, SCR3) each of which is assigned a value reflecting the value of the parameter in the "master copy" of the content stored in the server. The second portion 204 of the Start Card 200 updates the parameter values to reflect the value of the parameters stored locally in the terminal. As will become clear in the following, the second portion 204 sequentially effects access to the items (Link Decks) 230, 240 and 250 which form the next level in the hierarchy, each of which respectively effects access to the items (Storage Decks) 260, 262 and 264. Thus portion 204 ensures that the Link Decks and Storage Decks are loaded into the cache from the server if not already there.

The Option card 210 is entered on reaching the end of the Start Card 200. The option card has a number of portions 212, each of which is associated with a defined one of the Link Decks 230, 240, 250 in the second layer of hierarchy. On entering the Option Card the portions are automatically activated sequentially creating user selectable links 161, 163 etc. on the display of the terminal. On activation of each portion 212, a first function call 214 automatically provides the text indicia on the display indicating the presence of the user selectable link 161 and a second function call 216 automatically creates a user actuated link 161 to a defined content item in one of the Link Decks 230 in the second layer of the hierarchy. The first function call 214 provides the first text portion 172 and the second text potion or indicia 174 on the screen. The text portion or indicia 174 is dependent upon the local value of a parameter assigned in the second portion 204 of the Start Card 200. The links created by the second functions 216 are activated by the user selecting the link 161 displayed. Activation by the user causes the browser to access the defined content item in the second layer of hierarchy. The browser first tries to load the content item from the cache and if unsuccessful requests its transfer from the server.

The Exit Card is accessed when the application entered through the Main Deck 160 and represented by the hierarchy of content items in FIG. 6 is exited. The exit card controls the creation of the asynchronous messages 106 which are sent to the outbox, and ensures that the "master copy" of the content items stored in the server representing the application are updated to reflect any modifications effected by the browser.

The Link Deck 230 comprises a first card 232 and a second card 234. The deck is called a link deck as each provides for access from the Main Deck 160 to a pair of further items in the third level of hierarchy, namely a WML Deck which is a deck comprising content such as an email or news piece, and a Storage Deck which is a deck storing parameters associated with the WML Deck in the pair such as where the email or news piece has been read. The Link Deck 230 provides for access from the Main Deck 160 to the WML Deck 162 and the Storage Deck 260. The Link deck 240 provides for access from the Main Deck 160 to the WML Deck 164 and the Storage Deck 262. The link deck 250 provides for access from the Main Deck 160 to the WML Deck 166 and the Storage Deck 264

In the link deck 230, the first card 232 is accessed when the function Call Init_SCR1 in the second portion 204 of the Start Card 200 is activated. The browser attempts to access the card 232 using its URL from the cache, if it is unsuccessful, the browser requests the transfer of the deck 230 comprising card 232 from the server. Once the card 232 has been accessed, Init_SCR1 in card 232 is activated which accesses the storage deck 260 using its URL and returns the parameter value(s) stored therein as SCR1. The storage deck is accessed by first reading the cache using its URL and then if necessary requesting the transfer of the storage deck 260 from the server using its URL. Thus the function Call Init_SCR1 ensures the link deck 230 and storage deck 260 are stored locally in the cache and accesses the parameter value(s) stored in the Storage Deck.

In the link deck 230, the second card 234 is accessed when the second function call 216 of a portion 212 of the Option Card 210 is activated by selection of a link 161 by a user. The browser accesses the second card 234 by attempting to read the second card 234 from the cache 110 using its individual URL and if it is unsuccessful by requesting transfer of the deck 230 from the server. When the second card 234 is accessed, two functions are carried out. First, the browser accesses the storage deck 260 and updates the stored parameters there to indicate that the link provided by the link deck 230 has been activated. This in the examples given previously will adapt the content in the storage deck 260 so that the value SCR1 will create a symbol R as opposed to U on the screen when the first function call 214 of portion 212 in the Option Card creates the text/indicia 174 on the display. Second, the browser 100 accesses the deck 162 and processes the content therein. This access in the previous examples displays the text of an email or a news piece. As previously when the browser accesses an item, it uses the item's URL to attempt to read the item from the cache and if this is unsuccessful requests the transfer of the item from the server.

It should be appreciated that loading the Main Deck into the browser automatically provides means for creating the hierarchy of items within the terminal. The first portion 202 of the Start Card 200 brings the parameter values into line with the "master values" in the server. The second portion 204 of the Start Card 200 brings the parameter values into line with those stored locally in Storage Decks within the cache and transfers any Storage Decks or Link Decks from the server to the terminal which are not in the terminal's cache. Each portion 212 of the Option Card 210 creates a user selectable link and indicates the link on the display. The indication identifies whether the link has previously been activated which fact is derived from one of the parameter values.

The deck 162 when loaded in the browser creates a text message and a number of links which the user can use to return to the first level of hierarchy of the application or to leave the application altogether. A back option provides a link to the Main Deck using its URL. User selection of the link makes the browser access the Main Deck 160. The main Deck 160 is then loaded into the browser from the cache using its URL or, if necessary, from the server using its URL. An exit option provides for an exit from the application and entry of the main menu and a bookmark option allows the user to exit the application by selecting a bookmark which may represent another application or a link to other content not related to an application. User selection of the exit option or a bookmark is detected as an event in the browser and an event handler is arranged to control the subsequent action. When the exit option is selected, the Exit Card is accessed using its URL before the main menu is entered. When the bookmark is selected, the Exit Card is accessed using its URL before the content identified by the bookmark is accessed. When accessing the Exit Card 220, the browser first attempts to read the Exit Card from the cache 110 using its URL and if unsuccessful requests transfer of the Main Deck from the server and then reads the Exit Card 220.

The exit card 220 is used to keep the "master records" stored in the server in line with the records stored and updated in the browser. The storage decks 260 each store parameters which may vary during an application session. For example the parameter indicating whether a mail or news piece has been read will change if the deck containing the email or news is accessed also a parameter may indicate that the user has chosen to delete a news piece or email. The exit card creates a message 106 which identifies the new values of the changed parameters and sends it asynchronously to the outbox 130. The message is formed by accessing the storage decks 260, 262. This involves accessing the first card 232, 242, 252 of the link decks 230, 240, 250 respectively to obtain the new parameter values SCR1, SCR2, SCR3. The storage decks are stored in the cache which is of a size such that storage decks of an active application will not be deleted in the cache before the exit card sends a message 106 to update the server. According to an alternative embodiment the storage decks are prevented from being deleted from the cache until the server has been updated.

When a user of the terminal creates new content, for example, by authoring an email, this content is sent to the server using a message 106.

When the server receives a message 106 from the terminal, it updates the "master copy" of the content in the first example given above, it updates the values of the parameters SCR1, SCR2, SCR3 etc. which have been varied by the browser and communicated to the server. The server after updating the "master copy" pushes the Main Deck 200 from the "master copy" to the terminal. The Main Deck is sent in a message with an asynchronous identifier. The terminal receives the pushed Deck and directs it for storage in the cache, The server can update the application by transferring items to the terminal after they have been requested, that is synchronously, or without them having been requested by the browser, that is asynchronously. The messages containing, the items which are sent asynchronously are directed to the cache. Thus the server can update the application when appropriate, for example when it receives a new email or a new news piece.

If the terminal has a large enough cache, it would be possible to store all the items of the hierarchy needed to perform the application in the cache. The browser would not then need to request items from the server. If the browser in such a terminal was not configured to amend the content received from the server, then it is not necessary for the terminal to be able to transmit to the server. The transceiver 3 could in this case therefore be replaced by a receiver.

When the server receives a new item for the application, such as a new email, it:-updates the Start Card 200 of Main Deck 160 by introducing a new entry to each of first and second portions 202 and 204; updates the Option Card 210 of the Main Deck 160 by introducing a new portion 212 having first and second function calls 214 and 216; creates a new link deck having an individual URL and a first card accessible by the new entry in the second portion 204 of the Start Card 200 and a second card accessible on activating the link provided by the new portion 212 in the Option Card 210; creates new WML deck having an individual URL accessible via the second card of the link deck which stores the text of the new email; and creates a new Storage Deck having an individual URL accessible for reading from via the first card of the link deck and accessible for writing to via the second card of the link deck which stores a parameter indicating that the email is unread. The server creates a message containing the updated Main Deck and pushes it asynchronously to the terminal. As an alternative, the server may create a message for each of the new decks in the hierarchy formed and concatenate these messages and send the concatenated message asynchronously to the terminal.

The link decks de-couple the Main Deck from the WML Decks and Storage Decks. The WML Decks may be replaced without adapting the Main Deck by adapting the relevant link decks. The link decks provide a standard interface to the Main Deck while allowing the structure of the second and third levels of the hierarchy to be varied without replacing the Main Deck.

Figure 7:
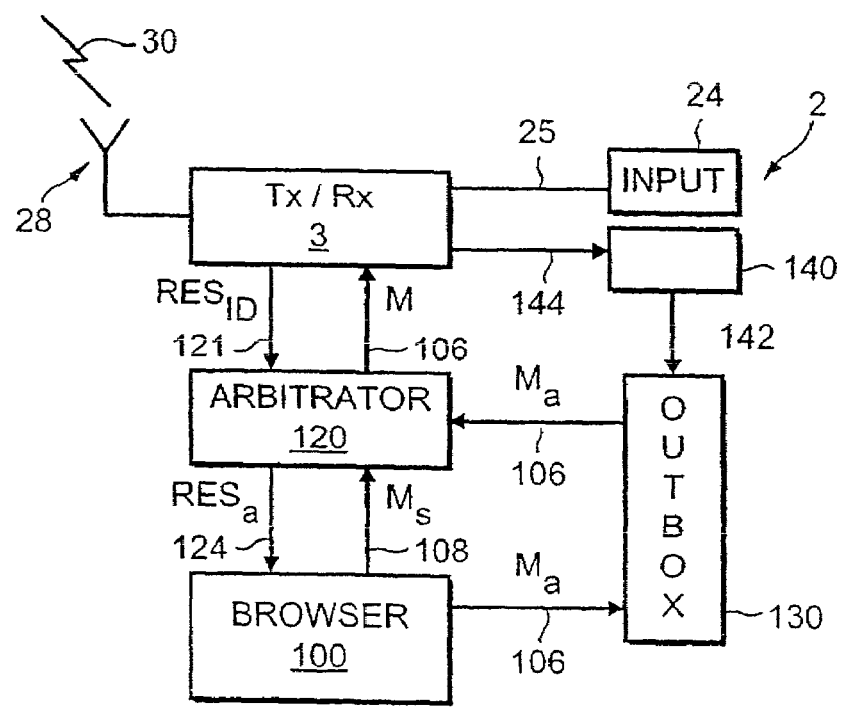
FIG. 7 is a schematic representation of a terminal according to a second embodiment.
Figure 8:
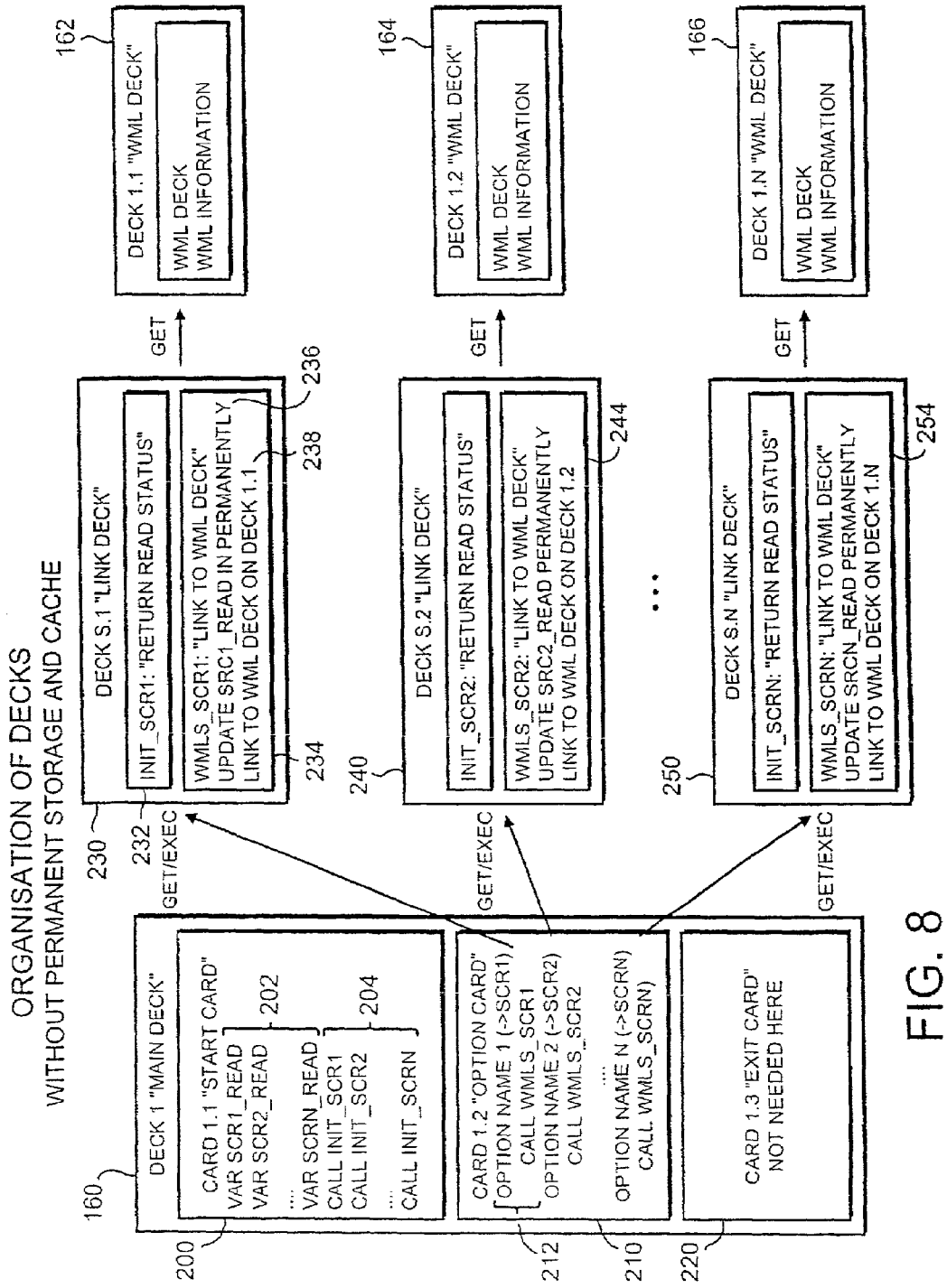
FIG. 8 represents an alternative hierarchy of decks suitable for use in the browser of FIG. 7.

FIG. 7 shows an alternative embodiment of the terminal previously described with relation to FIG. 4 and FIG. 8 shows an alternative hierarchy of decks suitable for use in the browser 100 of FIG. 7. The difference between the terminal 2 illustrated in FIG. 7 and that illustrated in FIG. 4, is that the terminal illustrated in FIG. 7 does not have a cache 110. A consequence of not having a cache is that all accesses made to items, whether decks or cards, using their URLs occurs by sending a request to the server for the relevant deck to be transferred to the terminal. Another consequence is that the application emulated by the hierarchy of decks does not have local storage as there is nowhere for the Storage Decks to be kept, thus Storage Decks are absent from FIG. 8. The terminal informs the server when an action occurs which changes a parameter. Consequently, the second cards 234', 244', 254' of the link decks have a different first function call 236', etc. to that described with relation to FIG. 6. The first function call 236' of the second cards 234', 244', 254' creates an asynchronous message 106 which is placed in the outbox. This message informs the server that the relevant WML Deck has been accessed and the server responds by adapting the relevant parameter and pushing a new Main Deck. The Main Deck 160 in FIG. 8 does not require an Exit Card 220' as there is no local storage.

Any annex attached to this application forms part of the present description.

Although the invention has been described with respect to a particularly preferred embodiment, it should be appreciated that the invention as defined by the claims extends beyond the particular features of the embodiment described to encompass modifications and variations to the embodiment not necessarily described.

The invention claimed is:

1. A terminal for providing an application using a browser, comprising:
   a transceiver arranged to send radio packets to and receive radio packets from a server;
   means for determining if the terminal and server are able to communicate;
   an outbox buffer; and
   a browser application for displaying content stored in the server, arranged to initiate a first application by accessing a first item associated with the first application from the server using a first content identifier, the application being provided by the combination of the first item and further items each of which is accessible using an individual content identifier, and each of which comprises content, or means for linking to content, the browser further comprising means for creating content in association with an item and means for transferring messages comprising the created content to the server, wherein if the terminal and server are able to communicate the browser sends the messages to the server and if the terminal and server are unable to communicate the browser temporarily stores the messages in the outbox until the terminal and server are able to communicate when the stored messages are automatically sent to the server.

2. A terminal as claimed in claim 1, wherein the means for transferring messages updates the items stored in the server for transfer to the terminal.

3. A terminal as claimed in claim 1, wherein the means for creating content creates a new further item which is then transferred by the means for transferring content.

4. A terminal as claimed in claim 1, wherein the means for creating content adapts the content of an existing item which is then transferred by the means for transferring content.

5. A terminal as claimed in claim 1, wherein the means for creating content creates content in dependence on the accessing of items by the browser.

6. A terminal as claimed in claim 5, wherein the means for creating content identifies that an item has been accessed.

7. A terminal as claimed in claim 1, wherein pairs of the further items are associated, the first further item of the pair holding content for access by the browser and viewing by the user and the second further item of the pair storing content identifying a parameter associated with first item.

8. A terminal as claimed in claim 2, wherein the parameter identifies whether the first further item has been accessed by the browser and viewed by the user.

9. A terminal as claimed in claim 8, wherein the means for creating content adapts the parameter of the second further item of a pair of further items when the first further item of the pair is accessed by the browser.

10. A terminal as claimed in claim 1, wherein the second further item of the pair is used to provide a visual indication on the display.

11. A terminal as claimed in claim 1, wherein the means for transferring the created content composes a message comprising the created content for transfer to the server.

12. A terminal as claimed in claim 11, wherein the message is sent asynchronously to the server by the means for transferring content.

13. A terminal as claimed in claim 10, wherein the message is stored in an output box buffer in the terminal until there is radio communication between the server and the terminal and is then emptied automatically.

14. A terminal as claimed in claim 10, wherein the means for transferring the content is activated on exiting an application.

15. A terminal as claimed in claim 1, wherein the first item is a deck and the means for transferring content is a card in the first item.

16. A terminal as claimed in claim 1, wherein each further item has means for exiting the further item when accessed by the browser, wherein activation of the exiting means updates the server and then the server transfers the updated item or items to the terminal.

17. A terminal as claimed in claim 1, wherein a further item when accessed by the browser has exit means for exciting the further item and simultaneously exiting the application.

18. A terminal as claimed in claim 17, wherein the exit means is an event handler activated by the creation of an event on exiting an item accessed by the browser.

19. A system comprising a server and a terminal for providing an application using a browser, the terminal comprising:
   a transceiver arranged to send radio packets to and receive radio packets from the server;
   means for determining if the terminal and server are able to communicate;
   an outbox buffer; and
   a browser application for displaying content stored in the server, arranged to initiate a first application by accessing a first item associated with the first application from the server using a first content identifier, the application being provided by the combination of the first item and further items each of which is accessible using an individual content identifier, and each of which comprises content, or means for linking to content, the browser further comprising means for creating content in association with an item and means for transferring messages comprising the created content to the server, wherein if the terminal and server are able to communicate the browser sends the messages to the server and if the terminal and server are unable to communicate the browser temporarily stores the messages in the outbox until the terminal and server are able to communicate when the stored messages are automatically sent to the server.

* * * * *